United States Patent [19]
Mintz et al.

[11] 3,850,559
[45] Nov. 26, 1974

[54] APPARATUS FOR VULCANIZING RUBBER MOLDS

[75] Inventors: Nathan H. Mintz, East Brunswick, N.J.; Edward H. Kamke, Jr., Sepulveda, Calif.

[73] Assignee: Unisil Molds, Inc., Freehold, N.J.

[22] Filed: Apr. 18, 1973

[21] Appl. No.: 352,336

[52] U.S. Cl.................. 425/144, 425/149, 425/157, 425/175, 425/408, 264/225, 100/211, 425/389, 425/DIG. 44
[51] Int. Cl.............................................. B29c 1/00
[58] Field of Search .......... 425/143, 149, 157, 160, 425/175, 408, 389, 406, DIG. 19, DIG. 44, 144, 160, 156; 100/211; 264/220, 225

[56] References Cited
UNITED STATES PATENTS

| | | | |
|---|---|---|---|
| 1,069,616 | 8/1913 | Hulbert | 425/175 X |
| 2,521,282 | 9/1950 | Butler | 425/143 |
| 3,158,089 | 11/1964 | Fillol | 425/389 X |
| 3,339,227 | 9/1967 | Ehrenfreund | 425/160 X |
| 3,597,794 | 8/1971 | Mann | 425/389 |
| 3,773,879 | 11/1973 | Munsil et al. | 425/175 X |
| 3,807,914 | 4/1974 | Paulson et al. | 425/149 |

*Primary Examiner*—Robert L. Spicer, Jr.
*Attorney, Agent, or Firm*—Martin Novack, Esq.

[57] ABSTRACT

This invention is applicable to a system for vulcanizing rubber contained in a mold frame and surrounding a master, the rubber, when ultimately vulcanized, forming a permanent mold from which reproductions of the master can be made. The mold frame has opposing surfaces which are compressible to apply a pressure to the rubber during processing. Specifically, the invention is directed to an improved apparatus and method for automatically applying prescribed pressures and temperatures to the rubber. In accordance with the invention there are provided a pair of spaced parallel platen assemblies adapted to receive the mold frame and engage the opposing surfaces thereof, the platen assemblies being provided with heating elements. A temperature sensor is provided, the sensor being positionable within the rubber in the mold frame. Control means are coupled to the temperature sensor and responsive thereto for generating pressure control signals. Also, means responsive to the pressure control signals are provided for actuating at least one of the platen assemblies to apply predetermined pressures to said opposing surfaces. In a preferred embodiment of the invention the control means actuates said platen assembly to cyclically relieve the pressure on the rubber to allow the escape of entrapped air.

14 Claims, 6 Drawing Figures

PATENTED NOV 26 1974　　　3,850,559
SHEET 1 OF 2

APPARATUS FOR VULCANIZING RUBBER MOLDS

BACKGROUND OF THE INVENTION

This invention relates to an apparatus and method for fabricating rubber molds or dies and, more particularly, to a system for vulcanizing rubber contained in a mold frame and surrounding a workpiece, the rubber, when ultimately vulcanized, forming a permanent mold in which reproductions of the workpiece can be cast.

The development of silicone rubber as a mold material offers advantages previously not available with organic rubbers. Vulcanized silicone rubber can withstand the melting temperature of zinc and several hundred reproductions or castings are normally achievable before serious mold deterioration begins. The overall procedure whereby a rubber mold is fabricated with cavities which reflect the shape of a master, and then reproductions of the master are cast in metal using the mold, is described briefly as follows:

A pair of unvulcanized silicone rubber discs are utilized in forming the mold shape. Each disc is typically about twelve inches in diameter, about half an inch thick, and has a centrally located hole. When unvulcanized and at room temperature, the silicone rubber has the consistency of modeling clay. The discs are sandwiched around the master piece and held in place in a mold frame. With the master imbedded, the rubber is vulcanized under pressure and at a temperature of about 340°F. The two vulcanized discs are then separated and the workpiece removed. Gates and runners are cut into each disc of the hardened rubber mold to provide a flow path from the central hole to the mold cavities.

To cast reproductions, the mold is placed in a centrifugal casting machine where it is spun around the axis of a feed pipe or "down sprue." Molten material, typically metal or plastic, is poured into the down sprue and is centrifuged through the runners into the mold cavities where it freezes quickly to form the desired reproductions of the master.

Returning to the fabrication of the mold itself, the processing under pressure is conventionally achieved using a press having parallel steel heating platens, one of which is movable. The setup is sketched in FIG. 1 which shows the unvulcanized rubber discs 20 and a workpiece 21 imbedded therein. The enclosing mold frame 22 consists of a circular steel ring 23 and disc-shaped end members 24 and 25 which are typically of aluminum. The top member 25 acts as a piston which applies pressure to the rubber when the movable platen 26 is urged toward the stationary platen 27 in the direction shown by arrow 28. In most present commercial equipments pressure is applied using a journal jack and ratchet to move and set the platen 26. As will be discussed, a substantial pressure is needed during processing of the rubber. The establishment of an initial high pressure is a simple guarantee that the minimum pressure on the rubber during processing (when it is heated) will be at least the initial high pressure. Heating elements, which provide necessary vulcanization temperatures in the rubber, are generally of the ceramic-insulated type similar to that widely used in home electric ovens. Because of the excessive pressures experienced at the platen surfaces, the ceramic heating elements, which cannot withstand high pressures, are typically recessed in the platens in cutout grooves provided for this purpose. A combination of a platen with a heating element or with additional apparatus mounted on or in a platen is referred to generically herein as a "platen assembly."

To understand the operation of the prior art press and recognize its deficiencies, it is helpful to review the manner in which uncured silicone rubber responds to elevated temperatures. Some terms must be specifically defined, however, to avoid confusion. In general, and subsequently in this specification, the entire process of heating the rubber until complete vulcanization is achieved is referred to as "curing." The term "vulcanization" will be reserved for that portion of the heating cycle during which vulcanizing agents (sometimes called catalysts) in the rubber effect cross-linkages in the polymer material in well known manner to obtain the finished properties of an elastomer. The term "scorch" is utilized to denote the portion of the heating cycle during which the rubber is brought to the temperature at which vulcanization starts. In other words, the "curing" cycle consists of "scorch" followed by "vulcanization."

As above stated, the unvulcanized silicone rubber has the consistency of modeling clay at room temperature. When heated during scorch the rubber becomes less and less viscous until, at a temperature typically around 250°F, it is quite liquid and flows easily. When the rubber reaches a certain critical temperature (typically about 330°F depending on the particular vulcanizing agent utilized) the vulcanizing agent is fully activated. To achieve a quality mold of properly vulcanized rubber it is important that the rubber remain above the critical temperature for at least a certain minimum time, for example ten minutes.

It is generally recognized that achievement of at least certain minimum pressures and temperatures during processing is required to obtain quality molds. The minimum pressure on the rubber is needed to get uniform heating and to "force" the rubber into any small mold crevices. The rubber temperature should be as uniform as possible and it is most important that all of the rubber spends at least the minimum prescribed time above the critical vulcanization temperature. If not, incomplete vulcanization will cause the mold to have an inferior structure which forms poor reproductions. It is also generally believed that no fatal disadvantages result from the application of unduly high pressure or the application of the critical temperature for an extended period ("overcooking"). Accordingly, it is the prevalent practice to apply relatively high pressures and temperatures for a period long enough to absolutely insure complete vulcanization. Much of the present procedure is thus a "brute force" approach. The platen assemblies are typically brought to a temperature that is ten to fifteen degrees above the critical temperature and it is assumed that the rubber will reach at least the critical temperature in due time. Also, an initial pressure of the order of 500 p.s.i. is generally applied and results in the rubber, after it is heated, experiencing pressures of the order of 1500 p.s.i. An arbitrary overall curing time of, say, 25 minutes for each quarter inch of rubber thickness, is usually selected. This is sufficient time to insure "overcooking".

The first and most obvious deficiency of present techniques relates to the loss of time associated with "overcooking" the rubber. There are, however, more subtle disadvantages which result from current brute force methods. For example, we have found that the recessed ceramic heating elements, necessitated by the excessively high pressures of mechanical presses, produce an undesirable non-uniform heating of the rubber. Also, excessive overcooking, while not as harmful as undercooking, has been discovered to produce rubber having less than optimum properties.

A further problem, one whose manifestations are familiar but which defies convenient solution, is the problem of entrapped air in the rubber. This air may be entrapped when the master is sandwiched between the rubber discs or air might have been milled into the rubber when it was originally produced. This entrapped air in the rubber is most undesirable in that the vulcanizing agent in the rubber has a preference to react with available air rather than the rubber. Thus the rubber in the vicinity of an air pocket or bubble is lacking in necessary catalyst and will be incompletely vulcanized. Also, substantial air bubbles may actually affect the shape of the mold and render it worthless.

There have been previous attempts at alleviating the problem of entrapped air. For example, mold frames of the type shown in FIG. 1 are often provided with vent holes in the ring 23 to "permit" the escape of air. For reasons to be subsequently discussed, this technique has not proved successful.

It is an object of the present invention to offer solution to the problems set forth and to provide an apparatus which produces quality rubber molds in an efficient manner.

SUMMARY OF THE INVENTION

The present invention is applicable to a system for vulcanizing rubber contained in a mold frame and surrounding a master, the rubbaer, when ultimately vulcanized, forming a permanent mold from which reproductions of the master can be cast. The mold frame has opposing surfaces which are compressible to apply a pressure to the rubber during processing toward vulcanization.

Specifically, the invention is directed to an improved apparatus and method for automatically applying prescribed pressures and temperatures to the rubber. In accordance with the invention there are provided a pair of spaced parallel platen assemblies adapted to receive the mold frame and engage the opposing surfaces thereof, the platen assemblies being provided with heating elements. A temperature sensor is provided, the sensor being positionable within the rubber in the mold frame. Control means are coupled to the temperature sensor and responsive thereto for generating pressure control signals. Also, means responsive to the pressure control signals are provided for actuating at least one of the platen assemblies to apply predetermined pressures to said opposing surfaces.

In a preferred embodiment of the invention the control means actuates said platen assemblies to cyclically relieve the pressure on the rubber to allow the escape of entrapped air. In this embodiment, the heating elements are in intimate contact with the surfaces of the platen assemblies that contact the opposing surfaces of the mold frame so that the applied pressures are applied through the heating elements.

Further features and advantages of the invention will become more readily apparent from the following detailed description when taken in conjunction with the accompanying drawings.

DESCRIPTION OF THE PREFERRED EMBODIMENT

Figure 1:
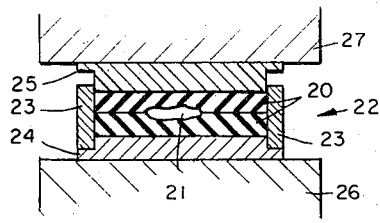
FIG. 1 is a cross-sectional view of a mold frame which was utilized in describing the background of the invention.
Figure 2:
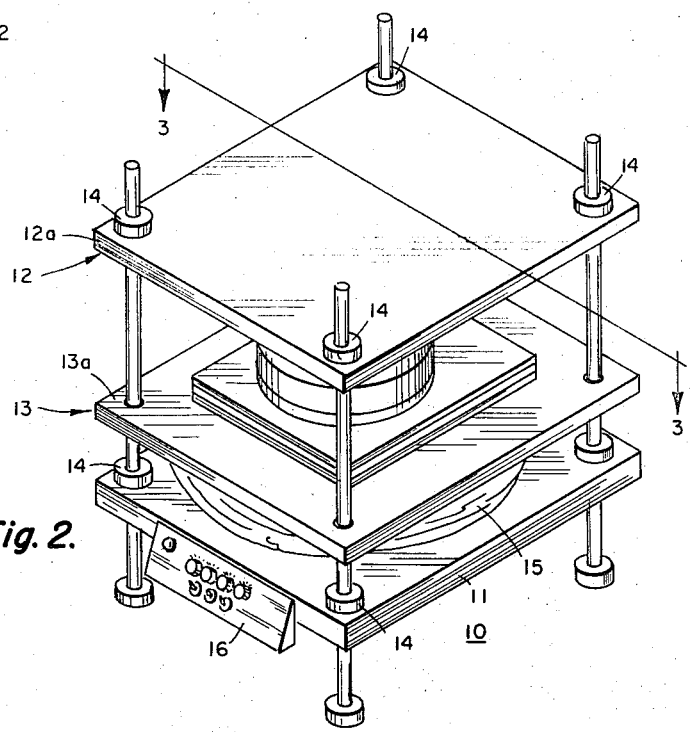
FIG. 2 is an elevational perspective view of an apparatus in accordance with the invention.

Referring to FIG. 2, there is shown a sketch of an apparatus in accordance with the invention. A press 10 is of the four-post moving-platen type that has a stationary steel plate 11 and a platen assembly 12 which includes and is mounted on another stationary steel plate 12A. The plates 11 and 12A each have four apertures which receive the posts and are held rigidly in place by bolts 14, some of which are visible in the Figure. A platen assembly 13 includes and is mounted on another steel plate 13A which also has four apertures to receive the posts but is free to move vertically. A pneumatic cylinder 15 (shown collapsed in FIG. 2) couples the stationary plate 11 to the movable plate 13A and can be controlled to move the plate 13 as desired. A control panel 16 is conveniently mounted beneath the lower plate 11 and houses a number of components to be described hereinafter.

Figure 3:
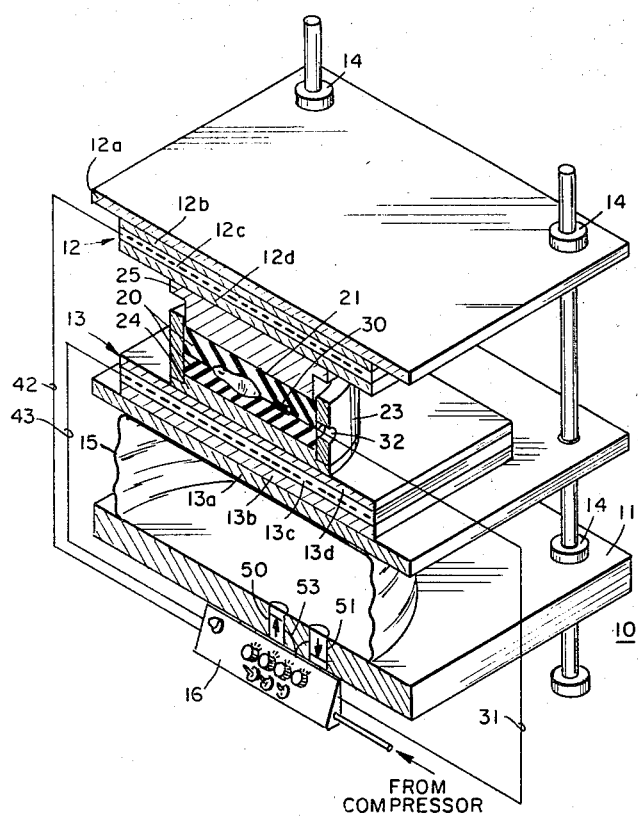
FIG. 3 is a cross-sectional view of the apparatus of FIG. 2 as taken through a section defined by arrows 3—3.

A more detailed description is facilitated by examining the cross-sectional view of FIG. 3 which shows the press 10 as holding a mold frame 22 (also in cross-section) with rubber discs 20 therein and a master piece 21 embedded between the discs. The enclosing mold frame 22 consists of a circular steel ring 23 and aluminum disc-shaped end members 24 and 25. As previously described in the background portion of this specification, the top member 25 acts as a piston which applies pressure to the rubber when the platen assembly 13 is urged upward toward the stationary platen assembly 12. In the illustration of FIG. 3 the cylinder 15 is shown as being expanded to apply the appropriate pressure.

In accordance with the present invention a temperature sensor 30, typically a thermocouple element, is positioned within the rubber in the mold frame. This may be easily done by placing the sensor 30 between the rubber discs when the mold frame "sandwich" is first prepared. The temperature sensor is coupled, via an insulated cable 31, to circuitry within the control panel 16. The cable passes through a small aperture 32 in the ring 23. (It may be noted that the cable 31, as well as other cables to be described, are depicted in viewable manner in FIG. 3, but in actuality the cables are routed in neat bundles by convenient paths such as through the vertical support posts.)

The platen assemblies 12 and 13 respectively include insulating layers 12B and 13B, heating elements 12C and 13C, and heating platens 12D and 13D. The insulating layer 12B, which may be of asbestos, is secured to the underside of the plate 12A and acts to isolate the exposed plate 12A from the heating element 12C. The platen 12D receives uniform heating by direct contact with the heating element 12C. The components of platen assembly 13 are similarly constructed. Each of the platen assemblies 12 and 13 also contains a centrally positioned thermosensing element (not shown). The power lines to the heating elements and the signals from the thermosensing elements are coupled through cables 42 and 43 which communicate with the control panel 16. The thermosensing elements are utilized, in known fashion, to regulate the power supplied to the heater elements to stabilize the platen temperatures as desired. As will become later apparent, the present system allows employment of a type of heating element which provides unusually uniform heating over the surfaces of the heating platens 12D and 13D.

The rubber pneumatic cylinder 15 is expandable by compressed air from a compressor (not shown), the air entering through a hose 45. A pair of pressure-switch/solenoid-valve combinations 50 and 51 regulate the pressure in the cylinder 15 under control of circuitry in the control panel 16. The switch/valve 50 regulates the air flow into the pneumatic cylinder 15, the valve opening when the pressure in the cylinder is below a prescribed value. The control over this prescribed value is represented by an electrical connection over a cable 53. Similarly, switch/valve 51 regulates the air flow out of the pneumatic cylinder 15, the valve opening when the pressure in the cylinder is above a prescribed value and control again being represented by the cable 53. By applying the appropriate control signals over the lines of cable 53 it will be appreciated that a desired pressure can be achieved.

Before describing the control circuitry and further details of the apparatus in general, it is useful to briefly review a processing cycle which can be performed with the present embodiment of the invention. The cycle, as recited, will include various temperatures, pressures and elapsed times which, it is understood, are adjustable for different types of rubber and different rubber disc dimensions.

The cycle begins with the movable platen assembly 13 at it rest or lowest position (i.e, no pressure in cylinder 15) and the mold frame 22 typically on a work bench awaiting loading. The apparatus 10 is turned "on" and the heating elements 12C and 13C are activated to "preheat" the platens 12D and 13D to a predetermined temperature, typically somewhat below the 350° temperature at which the platens 12D and 13D will ultimately be stabilized and remain during much of the cycle. While the platens are preheating an operator may be loading the mold frame with the two rubber discs 20, the master 21, and temperature sensor 30 sandwiched in between. The loaded moldframe is then placed on the platen 13D and a processing cycle is initiated and proceeds automatically from this point. The heating elements are energized toward their final temperature and the pneumatic cylinder 15 is actuated under control of the switch/valves 50 and 51 to raise the platen assembly 13 and apply a prescribed pressure to the rubber by virtue of compression of the mold frame end members 24 and 25. The applied pressure is typically of the order of 200 p.s.i. which, it may be noted, is considerably lower than the pressures generally applied in current conventional equipments. Subsequent steps of the cycle are under control of the temperature sensor element 30 which provides an accurate and direct measure of the temperature of the rubber at the approximate center of its thickness.

When the rubber temperature reaches a first threshold of about 175°F a series of cycles of pressure variations are initiated. Each such cycle consists of about one minute at the prescribed pressure followed by about one-half minute with the pressure relieved. These cycles are performed continuously one-after-another until the rubber temperature reaches a second threshold temperature of about 275°F. The purpose of these cycles will be discussed below. When 275°F is reached, the pressure cycling is discontinued and the original prescribed pressure of about 200 p.s.i. is again applied continuously. When the rubber temperature reaches a third threshold temperature of 340°, a predetermined time of about ten minutes is counted off whereupon all pressure is rleased, the platen assembly 13 lowers, and the equipment automatically shuts off. After appropriate cooling the cured rubber mold can be removed from the mold frame and utilized to make reproductions of the master 21 in the well known manner described above in the Background.

Figure 4:
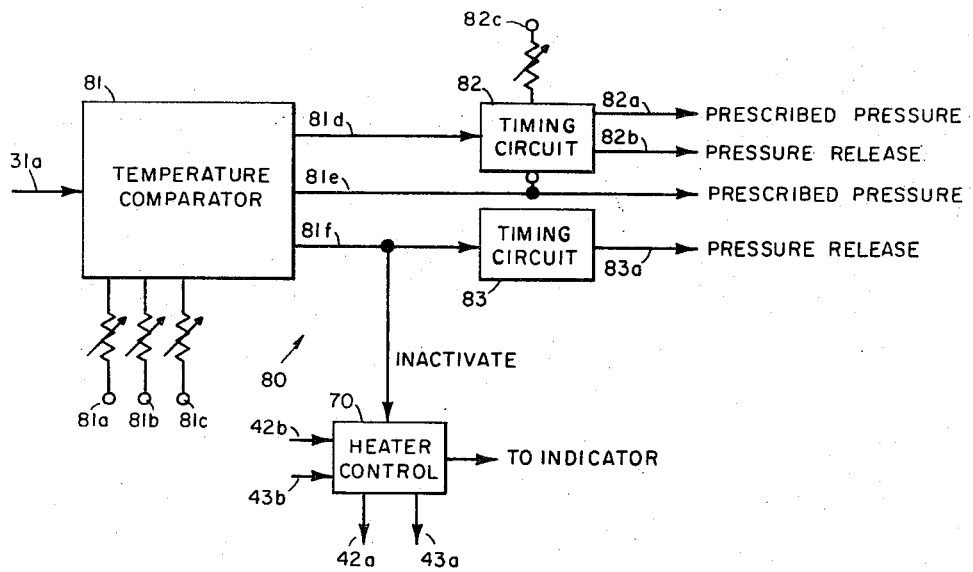
FIG. 4 is a block diagram of the control circuitry of the apparatus of FIG. 2.

A simplified block diagram of the basic circuitry in the control panel is shown in FIG. 4. The heater control unit 70 may be of a conventional thermostatic control type found in home heating units. The thermostat operates to periodically energize the heating coils over lines 42A and 43A to achieve and maintain the desired temperature which can be set at the control panel. Signals from the thermostatic elements, received over lines 42B and 43B, are used to monitor the platen temperatures. When the prescribed final platen temperature, 360°F in this case, is reached, a signal on line 58 energizes a lamp on the front of the control panel 16 to indicate same.

A pressure control unit 80 includes a temperature comparator module 81 and a pair of timing circuits 82 and 83. The temperature comparator module receives a temperature-indicative signal from the temperature sensor 30 (FIG. 3) over line 31A and compares the instantaneous temperature-representative signal for the rubber to temperature-representative reference signals that are established by adjusting the potentiometers 81A, 81B and 81C. These pots may be adjustable by knobs on the control panel 16 (FIG. 2). In the present embodiment, the adjusted signals preferably represent threshold temperatures of about 170°F, 275°F, and 340°F. When a rubber temperature of 175°F is reached, a signal is generated on a line 81D. Similarly, the rubber reaching temperatures of 275°F and then 340°F causes the generation of output signals on the lines 81E and 81F, respectively.

The lines 81D and 81E are coupled to a timing circuit 82 which produces an output signal 82A that controls the pressure switch/valves 50 and 51. Specifically, the presence of a signal on line 81D enables the timing circuit 82 to initiate a continuous sequence of outputs on the lines 82A and 82B. The output of line 82A lasts for 1 minute whereupon it shuts off and an output is present on line 82B for one-half minute. Then the output on line 82B goes off and the one on line 82A comes on again for 1½ minutes, and so on. There are various suitable ways of achieving this timing function. One conventional technique would employ a pair of monostable or "one-shot" multivibrators having unstable state times of 1½ minutes and one-half minute. The one-shots would be coupled to trigger one another.

The lines 82A and 82B are coupled to the pressure switch/valves 50 and 51. During the presence of a signal on line 82A the prescribed pressure, about 200 p.s.i. in this instance, continues to be applied on the rubber. However, when line 82B is active the pressure in pneumatic cylinder is relieved and the platen assembly 13 lowers thereby removing virtually all pressure on the rubber. When line 82A again becomes active the platen assembly 13 is again raised to apply the prescribed pressure and the pressure cycling continues in this manner.

When the rubber temperature reaches 275°F a signal is generated on line 81E. This signal disables the timing circuit 82 and also controls the pressure switch/valves 50 and 51 to again continually apply the prescribed pressure. When the rubber temperature reaches 340°F a signal is generated on line 81F and this signal inactivates the heating elements and triggers the timing circuit 83 which, in the present embodiment is set at ten minutes. During the next ten minutes the rubber continues to be heated, under the prescribed pressure, by residual heat in the heating platens 12D and 13D. The rubber will thus not be heated to an unnecessarily high temperature while complete vulcanization is still assured. After ten minutes have elapsed, timing circuit 83 generates an output on line 83A which is effective to cause release of all pressure from the pneumatic cylinder 15 so that the platen assembly 13 retreats to its lowermost position. If desired, the signal 83A can also cut off all power to the system.

The described procedure for pressure cycling the rubber during part of the scorch period has been found to virtually eliminate former problems associated with entrapped air. The success of the technique depends in part on providing the mold frame 22 with an end piston 25 that has a clearance fit with the ring 23 at elevated temperatures. This has not generally been the case in present systems. The piston 25 (as well as end member 24) is usually an "interference" fit with the ring 23 at temperatures above room temperature. In fact, the instruction literature of one major manufacturer makes reference to "prying" the piston out of the ring to allow removal of the rubber after processing. In the present embodiment of a clearance of approximately 0.1 inch is provided so that expansion of the aluminum piston 25 when heated will not cause an interference which could lock the piston and prevent a release of the pressure from the rubber during the pressure cycling.

Various techniques of pressure cycling have been previously implemented and are now utilized in conventional silicone rubber fabrication; i.e., where silicone rubber parts are manufactured. The problems encountered when fabricating a silicone rubber mold are different, however, since in this case the rubber surrounds a master shape rather than a mold shape surrounding a body of rubber. It is believed that in the present instance the pressure on the rubber prevents air from escaping even if vent holes are provided in the mold frame (as they conventionally are in the ring 23). Air, a gas, is compressible while silicone rubber is relatively incompressible. Thus, when the end members of the mold frame press on the rubber, a substantial pressure, for example 200 p.s.i., is established throughout the rubber. At the same time, any entrapped air has been compressed only a negligible amount and is experiencing a lesser pressure. However, since the walls of each "air pocket" (i.e., the surrounding silicone rubber) are at a higher pressure than the entrapped air itself, the air cannot easily diffuse through and escape from the rubber. If the air is not given a chance to escape it will remain and have the deleterious effects referred to in the Background. We have found that automatic pressure cycling in the described temperature range, which ends safely below the vulcanizing agent's activation temperature, is effective in evacuating entrapped air which has a chance to escape through rubber surroundings which are not under substantial pressure. Also, we have observed that entrapped air tends to escape more easily from the rubber when the rubber is in its least viscous state, so pressure relief during the specified temperature range is particularly advantageous.

It is seen that another advantage of the present apparatus is the elimination of guesswork regarding the amount of time the rubber spends above the critical vulcanization rubber. The temperature sensor 30 discloses a direct measure of rubber temperature. In the present embodiment a safe time above vulcanization temperature is guaranteed by the timer 83. Wasteful overcooking is therefore minimized as is any degradation of the finished product normally caused by overcooking.

The precise control of pressure allows controlled pressure cycling and also indirectly yields a benefit of uniform heating. Specifically, the elimination of the unduly high pressures of the prior art (again, largely necessitated by guesswork) allows the use of a relatively delicate type of heating element which can be coupled directly to the surfaces of the heating platens 12D and 13D.

Figure 5B:
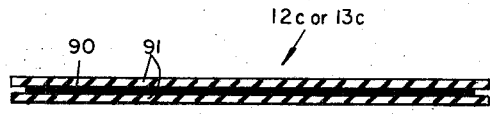
FIG. 5B is a cross-sectional view of the heating element of FIG. 5A.
Figure 5A:
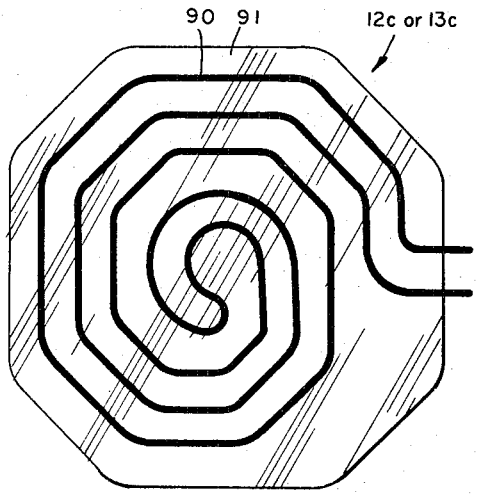
FIG. 5A is a top plan view of a heating element utilized in the apparatus of FIG. 2.

FIGS. 5A and 5B illustrate the type of heating element 12C or 13C that can be employed in the present embodiment. The heating element consists of a thin flat continuous metallic strip 90 which terminates at end terminals 92 and 93 that are suitable for coupling to a source of electrical energy. The strip 90 is sandwiched between sheets 91 of cured silicone rubber. In this embodiment the sandwich is about one sixteenth of an inch thick. The described type of heating element can provide unusually uniform heating over a platen surface but requires a particular type of surroundings. First, it is necessary that the operating heating element be continually pressed in intimate contact with the metal platen which serves as a "heat sink," so that a local build-up of heat does not burn away the insulating silicone rubber layers 91. At the same time, the sandwich cannot survive very high pressures such as those encountered in prior art presses. In the present invention, however, the control over the pressure exerted on the rubber (and thus through the components of the platen assemblies) cooperates to limit the pressure experienced by the heating elements to a sufficient degree to allow use of this desirable type of heating element.

It should be pointed out that the press 10 can be designed to receive mold frames which hold rubber discs (or any shape for that matter) of different sizes, there being a limited number of "standard" sizes prevalent in the industry. To determine the pressure applied to a given rubber disc, the force applied by the pneumatic cylinder 15 must, of course, be divided by the rubber disc area. Thus, for example, if a force of 22,600 lbs. is required to apply 200 p.s.i. to a twelve inch diameter disc (about 113 square inches), it follows that a 56 percent greater force of about 35,200 lbs. would be required to apply 200 p.s.i. to a 15 inch diameter disc (about 176 square inches). Thus, using simple ratios relating to disc areas in conjunction with corresponding parallel pressure switch circuit lines, the control panel can be equipped with settings that correspond to different standard disc sizes so that the correct prescribed pressure is applied in each case.

A further variation in system operation can be implemented to reflect different thicknesses of the rubber discs being used. It takes longer to cure a greater thickness of rubber and it has been found that the timing of the pressure cycling can be altered to take into account the longer time that it takes the rubber to pass through a particular range of temperatures. For example, the pressure cycling described above of 1 minute at prescribed pressure followed by one-half minute with pressure relieved is found to be suitable for a 1 inch thickness of rubber. However, when a 3 inch thickness of rubber is being cured it takes considerably longer to pass through the prescribed 175°F to 275°F range. In such case it is found that cycles of 4 minutes at prescribed pressure followed by one-half minute with pressure relieved are sufficient to allow entrapped air to escape. This lengthening of the cycle time, and accordant reduction in the total number of cycles, saves power and conserves compresser air. The cycle can be readily adjusted as desired using potentiometer 82C (FIG. 4) to modify the time constant of one of the oneshot multivibrators in timing circuit 82. The potentiometer control can be located on the control panel 16.

The invention has been described with reference to a particular embodiment but it will be appreciated that variations within the spirit and scope of the invention will occur to those skilled in the art. As an example, the pneumatic cylinder 15 may be replaced by other suitable controlled actuating means such as a hydraulic means. It can be noted in this context, however, that a pneumatic cylinder of the type shown offers the advantage of applying substantially equal force over a large area. This insures relative parallelism of the platen assemblies without the need for an extremely close fitting moving plate 13A which may be needed when a "point" pressure is applied at the center of the plate (as is the present prevalent practice). The parallelism or flatness of the cured rubber mold is a significant factor in obtaining quality reproductions.

We claim:

1. In a system for vulcanizing rubber contained in a mold frame and surrounding a workpiece, the rubber, when ultimately vulcanized, forming a permanent mold in which models of the workpiece can be cast, the mold frame having opposing surfaces which are compressible so as to apply a pressure to the rubber during processing toward vulcanization; an improved apparatus for automatically applying prescribed pressures and temperatures to the rubber, comprising:

a pair of spaced parallel platen assemblies adapted to receive the mold frame and engage the opposing surfaces thereof, said platen assemblies containing heating elements;

a temperature sensor positionable within the rubber in the mold frame;

control means coupled to said temperature sensor and responsive thereto for generating pressure control signals; and means responsive to said pressure control signals for actuating at least one of said platen assemblies to apply predetermined pressures to said opposing surfaces.

2. The apparatus as defined by claim 1 wherein said control means includes means for generating pressure control signals which actuate pressure cycling when said temperature sensor indicates a rubber temperature within a predetermined temperature range.

3. The apparatus as defined by claim 1 wherein said heating elements are disposed in intimate contact with the surfaces of the platen assemblies that contact said opposing surfaces so that the applied pressures are applied through said heating elements.

4. The apparatus as defined by claim 2 wherein said heating elements are disposed in intimate contact with the surfaces of the platen assemblies that contact said opposing surfaces so that the applied pressures are applied through said heating elements.

5. The apparatus as defined by claim 1 wherein said control means includes means for inactivating said heating elements and said actuating means a given time after said temperature sensor indicates a prescribed rubber temperature.

6. The apparatus as defined by claim 1 wherein said control means includes means for inactivating said heating elements when said temperature sensor indicates a prescribed rubber temperature and for inactivating said actuating means a given time thereafter.

7. The apparatus as defined by claim 6 wherein said prescribed rubber temperature is above the vulcanization temperature of the rubber.

8. The apparatus as defined by claim 6 wherein said heating elements are disposed in intimate contact with the surfaces of the platen assemblies that contact said opposing surfaces so that the applied pressures are applied through said heating elements.

9. The apparatus as defined by claim 2 wherein said control means further includes means for inactivating said heating elements when said temperature sensor indicates a prescribed rubber temperature and for inactivating said actuating means a given time thereafter.

10. The apparatus as defined by claim 9 wherein said heating elements are disposed in intimate contact with the surfaces of the platent assemblies that contact said opposing surfaces so that the applied pressures are applied through said heating elements.

11. The apparatus as defined by claim 1 wherein said actuating means comprises a pneumatic cylinder in conjunction with pressure control valves.

12. The apparatus as defined by claim 2 wherein said predetermined temperature range is the range between about 175°F and 275°F.

13. The apparatus as defined by claim 2 wherein said pressure cycling is defined as a condition of alternation between the pressure applied prior to cycling and the substantial absence of pressure.

14. The apparatus as defined by claim 1 wherein said control means includes timing means for generating cyclical pressure control signals.

* * * * *